United States Patent
Langmeier et al.

(10) Patent No.: US 6,553,324 B2
(45) Date of Patent: Apr. 22, 2003

(54) METHOD AND DEVICE FOR DETECTION OF A DEFECT IN A SENSOR SYSTEM

(75) Inventors: Andreas Langmeier, München (DE); Winfried Lohmiller, München (DE)

(73) Assignee: Eads Deutschland GmbH, Munich (DE)

(*) Notice: Subject to any disclaimer, the term of this patent is extended or adjusted under 35 U.S.C. 154(b) by 5 days.

(21) Appl. No.: 09/907,516

(22) Filed: Jul. 17, 2001

(65) Prior Publication Data

US 2002/0016692 A1 Feb. 7, 2002

(30) Foreign Application Priority Data

Jul. 18, 2000 (DE) .......... 100 35 285
Aug. 3, 2000 (DE) .......... 100 65 920

(51) Int. Cl.[7] ............................................. G06F 19/00
(52) U.S. Cl. ........................................ 702/35; 702/81
(58) Field of Search .............. 702/35, 116, 104, 702/185; 701/213, 214; 708/322; G01R 31/3193; G01D 1/018; G06F 19/00

(56) References Cited

U.S. PATENT DOCUMENTS

| | | | |
|---|---|---|---|
| 5,235,527 A | * | 8/1993 | Ogawa et al. ......... 364/571.05 |
| 5,532,950 A | * | 7/1996 | Moses et al. .......... 364/724.19 |
| 5,680,409 A | * | 10/1997 | Qin et al. ...................... 371/48 |
| 5,870,486 A | * | 2/1999 | Choate et al. .............. 382/103 |
| 5,991,525 A | * | 11/1999 | Shah et al. ............. 395/500.23 |
| 6,016,465 A | * | 1/2000 | Kelly .......................... 702/116 |
| 6,424,985 B1 | * | 7/2002 | Lee ............................. 708/32 |

OTHER PUBLICATIONS

Xinmin, Z; Yongsheng, N; "Sensor Failure Detection Based On ON–Line Learning Neural Predictor"; Conference Proceedings of 2nd InternationalSymposium on Test and Measurement; Jun. 1997; pp. 298–301.*

* cited by examiner

Primary Examiner—John Barlow
Assistant Examiner—Douglas N Washburn
(74) Attorney, Agent, or Firm—Ladas & Parry

(57) ABSTRACT

A method for implementation in a measuring system containing a sensor system and an arithmetic unit for detection of a defect in the measuring system, wherein at least one state variable of the system is derived from at least one sensor value in the measuring system, wherein a cost function value based on deviation of the measured value y from the calibration as a function of a previously calculated state x is calculated for the respective measurement and the calculated squared deviation is then compared with a corresponding threshold value. An error is identified and if necessary appropriate action is taken if the threshold value is exceeded.

12 Claims, 1 Drawing Sheet

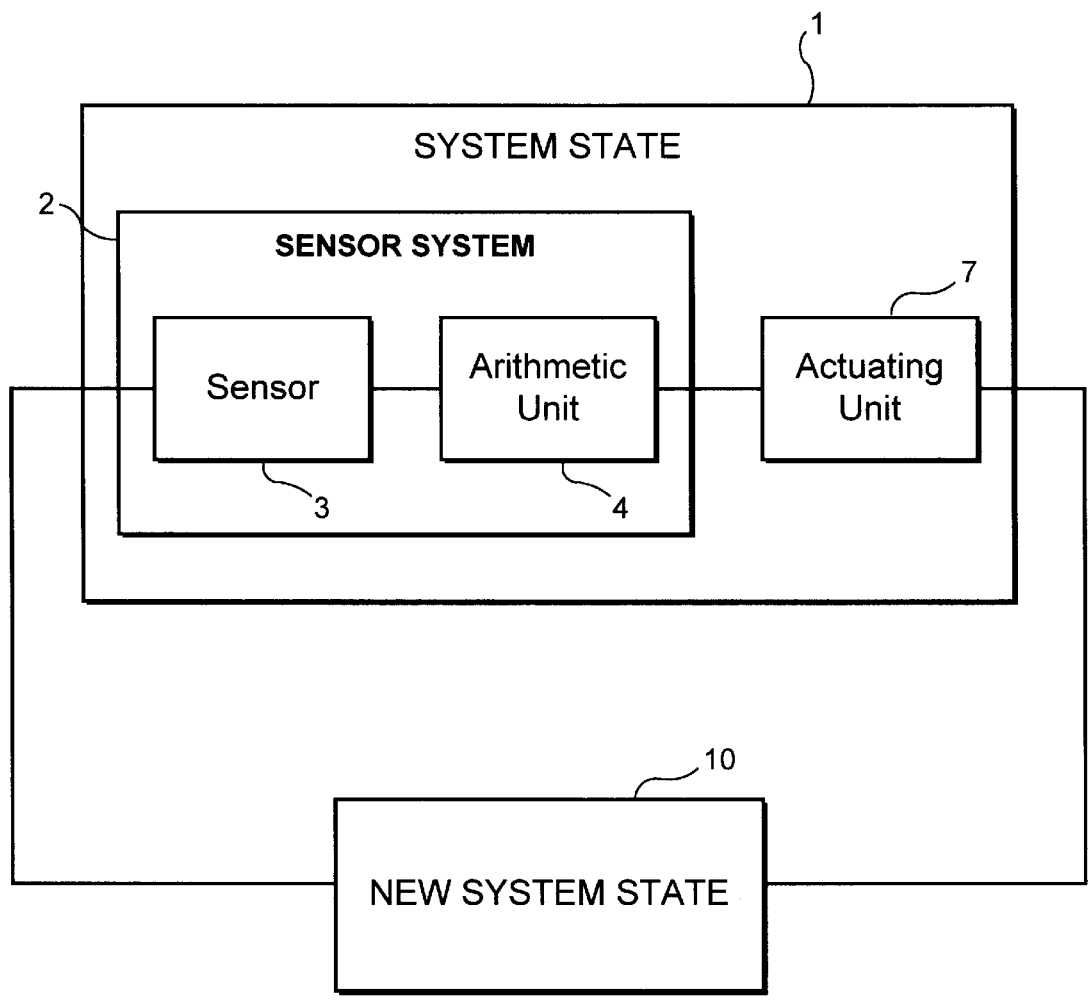

METHOD AND DEVICE FOR DETECTION OF A DEFECT IN A SENSOR SYSTEM

BACKGROUND OF THE INVENTION

The invention relates to a method and a device for implementation in a measuring system containing a sensor system and an arithmetic unit for detection of a defect in the measuring system, wherein at least one state variable of the system is derived from at least one sensor value in the measuring system, and wherein the defect may be an error of measurement, function, algorithm, software, hardware, calibration or modeling.

In systems whose state variables can be sensed by means of at least one sensor of a sensor system with an associated arithmetic unit the most accurate possible determination thereof from at least one measured variable per measurement or iteration step is of great importance for the functionality of the system. This applies in particular for systems which are critical to safety, such as air data systems of an aircraft since, if the factor of safety for accuracy of the measured variables is not sufficient, further measures such as further sensors are necessary in order to achieve the required factor of safety of the overall system. Corruption of an accuracy proposition in a system which is critical to safety, such as an air data system or the system for determination of chemical or nuclear states in reactions, can lead to a catastrophe such as an aircraft crash or an explosion. Furthermore, to assure the required factor of safety, sensor defects must be detected and eliminated with high reliability.

According to the general prior art, modern sensor systems that must meet safety requirements in corresponding applications are redundantly designed, and for this purpose both the sensors and the data-processing system for calculating the state variables of the system may be provided redundantly. In special applications, such as in controlled aircraft, particularly stringent safety requirements the arithmetic units such as flight computers associated with the sensors are designed with dissimilar hardware and also software. Thus the expense for meeting stringent safety requirements is very high.

In systems with at least one sensor system which is provided with at least one sensor and an arithmetic unit associated therewith for determination of at least one state variable of the system, there are known, for example, methods which correlate a particular state variable with a measured value of the sensor, possibly as a function of further parameters of the system, via calibrations of the sensor. In particular, a method for an air data system is known in which a determination of the instantaneous n-dimensional state variables x of the system from at least one sensor signal is undertaken by means of a cost function $\chi^2(x, y, u)$, which comprises calibration curves or surfaces, in order to optimize the accuracy and reliability of the states x to be determined. This method is published in, for example, Friehmelt, H. and Jost, M., Flush Air Data System—An Advanced Air Data System for Aerospace, 1999 Annual Meeting of the German Aerospace Association, Berlin, Proceedings, 99–180, page 5. In this method there are used calibration curves or surfaces of pressure measurements, representing the measured variable y of the sensor, which is generally a vector, and which depends on the air data as the sought state variables x and on known configurations or controller inputs u. The calibration curves or surfaces are then used in the form of an already known mathematical relationship $y=y(x, u)$.

This cost function is recreated for each measurement y, since it depends on the measured value y which is relevant for the respective measurement and possibly on the system parameter u which is relevant for the particular situation. For each cost function of a measurement, the minimum of the cost function is calculated in order to determine the instantaneous state variables x. As an example, this is accomplished by beginning from one or more start vectors $x_o$ of the cost function by means of prior art methods, for example by means of a gradient method. In the process, the cost function $\chi^2(x_o, y, u)$, beginning from a randomly selected first initialization $x_o$ of the state, is decreased by recursive variation of x along the gradient of $\chi^2$ until a local minimum of $\chi^2$ relative to x is reached.

These prior art methods indeed lead to an accuracy prediction or covariance P for the states x to be determined. This accuracy prediction is correct, however, only if all measured signals and calibration surfaces exhibit normal accuracies. If, for example, a measured signal becomes inaccurate due to a sensor defect or the system becomes decalibrated, the accuracy propositions P are no longer true, since the covariance is modeled only for the state of the intact and not of the defective sensor or calibration.

SUMMARY OF THE INVENTION

An object of the invention is to provide a method as well as a device which permits detection of errors of the measured variables y and assessment of the quality of the calculated accuracy propositions P of the state x even in defective sensor systems.

According to the invention a method for implementation in a measuring system containing a sensor system and an arithmetic unit for detection of a defect in the measuring system, wherein at least one state variable of the system is derived from at least one sensor value in the measuring system, the improvement comprising calculating a cost function value based on deviation of the measured value y from the calibration as a function of a previously calculated state x for the respective measurement and comprising the calculated cost function value with a corresponding threshold value to identify an error if said threshold value is exceeded.

BRIEF DESCRIPTION OF THE DRAWING

The invention will be described hereinafter on the basis of the sole FIGURE of the drawing which is a schematic diagram of a system containing a sensor system for which the method of the invention is intended.

DETAILED DESCRIPTION

System 1 illustrated in FIG. 1 is provided with a sensor system 2 containing at least one sensor 3 and one arithmetic unit 4, which may comprise one module or a plurality of modules. This arithmetic unit 4 may also be integrated functionally or by means of hardware in a unit other than sensor system 2. Sensor 3 delivers at least one measured value, from which arithmetic unit 4 calculates one or more state variables. Arithmetic unit 4 includes the inventive method and may additionally include a control means for control of states or state variables of system 1. Arithmetic unit 4 generates actuating signals or commands for an actuating unit 7 for changing at least one state variable of system 1. A change of system state, which is denoted by reference symbol 10, is in turn sensed by the at least one sensor 3.

System 1 can be designed for a large number of applications, such as calculation of state variables of an aircraft from pressure measurements, determination of concentrations or temperatures in chemical or nuclear processes, or determination of deformations and forces in structural mechanics. System 1 can also be an air data system of an aircraft, in which sensor system 2 comprises a plurality of pressure bores as sensors 3 and an associated arithmetic unit 4 for calculating system states. Sensor system 2 can also be a GPS, radar or inertial system for a vehicle, in order to fix the vehicle's orientation or to calculate the vehicle's position. A further application of the invention relates to the sensor systems of actuators, which are designed to calculate, for example, the position or velocity of components thereof.

The error detection method according to the invention, together with the functions for calculating the state variables if necessary, is implemented in arithmetic unit 4, which comprises one module or a plurality of modules.

Calibration surfaces or curves, abbreviated as calibrations, for use in a cost function or in a plurality of same, are also stored therein to allow the inventive method to be carried out. If measurement of the states is directly possible, the calibrations can be a constant factor or can even be completely omitted. The calibrations are calculated by means of experiments or computations before the method is carried out, and are stored in arithmetic unit 4 in the form, for example, of tables. The calibrations represent a relationship in which measured or sensor values can be determined from at least one state variable.

In arithmetic unit 4 there can also be implemented a computation module, with which the vector system state x is determined, for example from measurements y. In this connection it is also possible that the system state or even the measurement can each be described by only one variable. This can be provided by means of a cost function and also, as an alternative or addition thereto, by means of a filter or observer. In this method there are additionally used a number of historical measured or state variables for calculation of the state variables by a recursive method. Calculation of system states can also be accomplished by means of neural networks. The computation module is not necessary if the measurements y correspond directly to system states x.

The functions allocated to arithmetic unit 4 can also be divided among a plurality of arithmetic units and, in particular, can be implemented in a manner dislocated from the at least one sensor 3.

In the use of a cost function for determination of the vector system state x from measurements y, any kind of prior art cost functions can be used.

For subsequent error detection according to the invention, a special cost function $\chi^2(x, y, u)$ is additionally implemented in arithmetic unit 4. For error detection, a cost function value based on the deviation of measured value y from the calibration as a function of a previously calculated state x is calculated by means of this cost function for the respective measurement. In a special embodiment of the cost function, this computes the squared deviation $\chi^2$ of an actual measured value from the calibrations as a function of the previously calculated state x or of a function derived therefrom. The cost function used according to the invention for error detection can additionally embody weighting of a deviation of the measured value y from the calibration y(x, u). Weighting can be applied by the measured-value or calibration accuracy R, by an expected, required or estimated accuracy requirement R, by the number of measurements which corresponds to the dimension of the measured vector y, or by any other suitable variable. This weighting variable is generally a variable which defines the measuring method being used in the particular situation. For the case that the weighting variable is an accuracy R, the following basic structure is used according to the invention for the inventive cost function:

$$\chi^2 = [y - y(x, u)]^T R^{-1} [y - y(x, u)]$$

The used variables x, y and u are preferably vector variables. The formula can also be appropriately supplemented or expanded for the respective application, but the indicated basic structure is still retained.

This cost function is recreated for each measurement y, and therefore, for example, in each iteration step, since it depends on the respective measured values y of the system state x and possibly on relevant system parameters u. According to the invention, the term [y−y(x, u)] is calculated directly for each measurement y. In this connection, y(x, u) is obtained from the calibration, the previously calculated system state x and the known parameters u. In this connection, measurement y can extend over several time steps, in which case a commensurate time delay occurs in error detection. The number of time steps must therefore be chosen to match the system requirements.

Sensor accuracy R can be the expected sensor accuracy under normal conditions. Alternatively, a minimum sensor accuracy requirement imposed by the user on measurement y can also be used for sensor accuracy R. For the case that an observer or a filter is implemented in arithmetic unit 4 for estimation of state x of system 1, R for the estimated variables can also be defined on the basis of the expected accuracy of the observer.

Using known methods, a user requirement for the accuracy of state x can also be transformed to a sensor accuracy R. Depending on application, therefore, an assumed or a required accuracy can be used as the sensor accuracy. If the calibration accuracy is important for the respective application, it can be calculated on the basis of experiments or computations by prior art methods.

In a special embodiment of the invention, in the example of air data determination, the cost function to be used for error detection can contain a factor whereby a deviation of the measured value y from the calibration y(x, u) of the air data is weighted by the measured-value or calibration accuracy R or by an accuracy requirement R. In this connection the cost function can be written specifically as follows:

$$\chi^2 = [y - (c_p q_c + p_s)]^T [Cov(c_p) q_c^2 + \sigma_p^2]^{-1} [y - (c_p q_c + p_a)]$$

where $Cov(c_p)$ denotes the calibration accuracy and $\sigma_p^2$ the sensor accuracy. In this connection y is the pressure measurements, $c_p(x, u)$ is previously determined calibration curves or surfaces in the form of a functional relationship, and $Cov(c_p)(x, u)$ is previously determined accuracies of the calibration surfaces. State x is formed from the air data α, β, $q_c$ and $p_a$, and $\sigma_p$ describes the pressure-transducing accuracy of the pressure apertures.

In a first embodiment of the invention, after computation of the weighted squared deviation $\chi^2$ of the respective measured value from the calibrations by means of the cost function, the value of the weighted square or of the cost function or of a function derived therefrom is compared with a preset corresponding threshold value. This threshold value is a measure of a required factor of safety for the state variable in question. For this purpose, an error detection module for performing this step can be implemented in arithmetic unit 4. If this threshold value is exceeded, the presence of an error in system 1 or an associated function is signaled, and an appropriate reconfiguration action is executed if necessary to maintain safety or functionality of the system.

In a second embodiment, the accuracy prediction R of measured values y or of state x is checked by means of a confidence estimate, which permits confidence in the predicted accuracy. Confidence is the probability that the true accuracy of measured values y or of state x is better than the assumed accuracy R.

For this purpose a functional map is established between the computed squared deviation $\chi^2$ of the respective measured value from the calibrations of the determined state and the confidence as a function of the number of redundant measurements.

The number of redundant measurements is obtained from the difference between dimension m of measured vector y and the dimension n of the calculated system state x for each iteration step. Alternatively or additionally, the number of redundant measurements can also be obtained from a large number of iteration steps with one measurement each. This can be the case when filters or observers are used. The number of redundant measurements is then equal to the difference between the number of all measurements used and the dimension n of all calculated system states x, multiplied if necessary by the number of time or iteration steps with one measurement each used in error detection.

The confidence calculated in this way is then compared with a threshold value, as in the first embodiment of the inventive error detection method. In the second embodiment, this threshold value defines a required minimum probability with which the true accuracy must be better than the accuracy assumed above. If it is exceeded, an error signal is tripped.

For reconfiguration of the system to an error-free system state, appropriate system actions can then be taken. In this connection the error, or in other words especially the defective individual sensor, must first be identified. For this purpose there can be used an appropriate redundant component, which ascertains the defective component of the system by comparison.

The following procedure can be adopted alternatively or additionally: An arbitrary first element of measurement y is removed and state x for this reduced measurement y is redetermined by the above method. The costs $\chi^2$ and thus the confidence of this reduced measurement is then calculated once again as described above. If this confidence is then under the respective predetermined threshold value, the above measured element corresponds to a defective measurement, which has therefore been detected.

If the result is still not below the threshold value, all other elements of the measurement must then be removed in permutations until a result below the threshold value for the confidence is obtained. In this way it is possible to locate a defective sensor. If this does not happen, the entire state x is defective and must be declared as such, since it no longer satisfies its confidence requirements.

This method permits the detection and identification of any errors in the functional sensor system 2, and especially errors of measurement, errors of functions and/or algorithms, errors of software and/or hardware as well as errors of calibration and modeling.

What is claimed is:

1. In a method for implementation in a measuring system containing a sensor system and an arithmetic unit for detection of a defect in the measuring system, wherein at least one state variable of the system is derived from at least one sensor value in the measuring system, the improvement comprising:

calculating a cost function value based on deviation of the measured value y from a calibration as a function of a previously calculated state x for the respective measurement, and comparing the calculated cost function value with a corresponding threshold value to identify an error if said threshold value is exceeded.

2. The method of claim 1, wherein for determination of the cost function value, the squared deviation $\chi^2$ of an actual measured value from the calibrations is computed as a function of the previously calculated state x.

3. The method of claim 1, wherein the cost function is weighted by a variable which defines the measuring method being used in the particular situation.

4. The method of claim 3, wherein the cost function is weighted by an accuracy requirement R or by the number of measurements which corresponds to a measured vector y.

5. The method of claim 1, wherein for comparison with the threshold value, the calculated cost function value is compared directly with a corresponding threshold value, an error signal being produced if the threshold value is exceeded.

6. The method of claim 1, wherein to perform the comparison with the threshold value, a confidence factor is determined from the value of the cost function and the confidence factor is compared with a confidence threshold value, an error signal being produced if the threshold value is exceeded, and determining a functional map between the computed squared deviation $\chi^2$ of the respective measured value from the calibrations of the determined state and the confidence factor as a function of the number of redundant measurements being established in order to form the confidence factor.

7. The method of claim 1, wherein in response to production of an error signal, an error identification procedure is performed in which a first element of the measurement y is removed and the state x for this reduced measurement y is determined, then the cost function value of the reduced measurement is calculated, it being assumed that the error has been identified if the result based on this cost function value is below the respective predetermined threshold value and, if the result is not below the predetermined threshold value, other elements of the measurement are removed in permutations until the result is below the threshold value and thus the error is identified.

8. The method of claim 1, wherein the derivation of the at least one state variable of the system is accomplished by direct derivation of state variables from measured variables.

9. The method of claim 1, wherein the derivation of the at least one state variable of the system from measured variables is accomplished by the cost function, wherein calibrations are utilized which represent a relationship in which measured or sensor values can be determined from at least one state variable.

10. The method of claim 1, wherein the derivation of the at least one state variable of the system from measured variables is accomplished by a filter, with which the sought state variables are estimated.

11. The method of claim 1, wherein the sensor system is a GPS, radar or inertial system for calculation of orientation or position of a vehicle.

12. The method of claim 1, wherein the sensor system is an air data system for an aircraft.

* * * * *